Oct. 13, 1925.
E. BUCKINGHAM
TRANSMISSION
Filed March 26, 1924
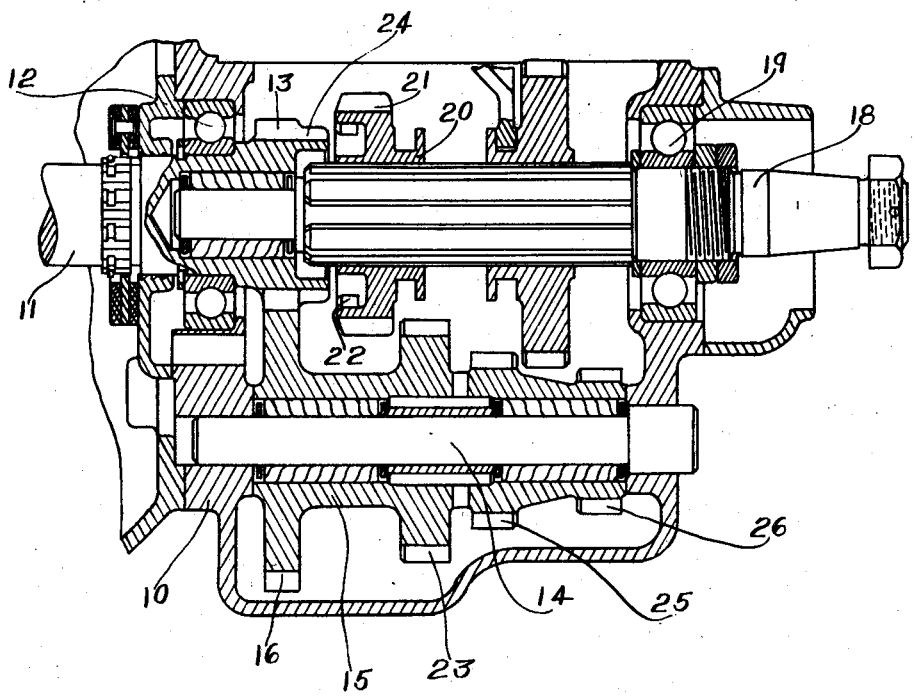
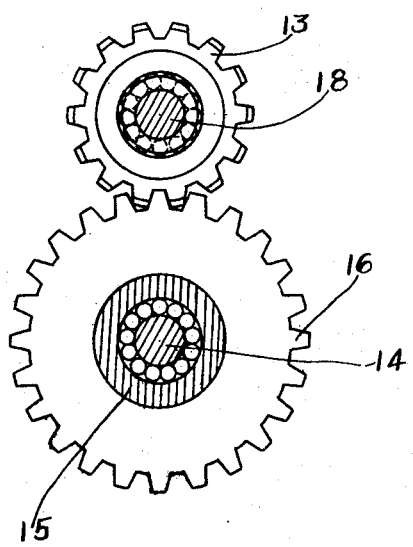
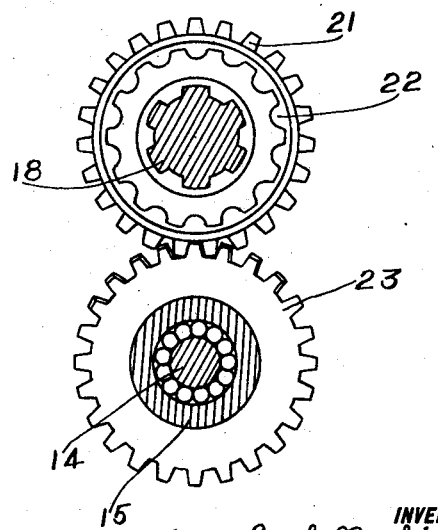
INVENTOR
Earle Buckingham
BY
Joseph K. Schofield
ATTORNEY Patented Oct. 13, 1925.

1,556,754

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

TRANSMISSION.

Application filed March 26, 1924. Serial No. 702,161.

*To all whom it may concern:*

Be it known that I, EARLE BUCKINGHAM, a citizen of the United States, residing at Hartford, in the county of Hartford and State of Connecticut, have invented certain new and useful Improvements in Transmissions, of which the following is a specification.

This invention relates to change speed gearing and particularly to a change speed mechanism adapted for automobiles.

An object of the present invention is to provide an improved speed transmission in which gears are utilized which will eliminate discordant noises and thus be more desirable in transmissions for automobiles or for other purposes where quiet is a great desideration.

One feature which enables me to accomplish the above named object is that the gearing is so designed that pairs of intermeshing gears will produce sound vibrations of equal pitch. The only sound heard therefore will be this simple sound whether one or more pairs of gears are in mesh.

The invention is particularly adapted, as aforesaid, for automobile transmissions and the invention will be illustrated in connection with a conventional form of transmission. The novel features of the invention are applied to the constant mesh pair of gears whereby whether the gears are in mesh for high speed or for an intermediate speed, the sounds generated by each pair will be of equal or similar pitch and sound.

It is well known in automobile transmissions that distinct noises originate both in the constant mesh and in the intermediate pairs of intermeshing gears, and, when the intermediate speed gears are in mesh the sounds are usually discordant and for that reason unpleasant. When the car is being driven with the gears in their high speed position, the constant mesh gears only create a sound, and this with properly designed and generated gears creates no unpleasant sound.

It is therefore a principal object of the invention to so design the constant mesh gears and the intermediate pair of change speed gears of an automobile or other form of geared transmission mechanism that no unpleasant or discordant sounds will be generated whether the gears are in high or intermediate drive positions.

With these and other objects in view, my invention consists in the features of construction and proportions of parts set forth in the following specification and illustrated in the accompanying drawing.

In the accompanying drawing annexed hereto and forming a part of this specification, I have shown my invention embodied in the high and second speed drives of an automobile transmission mechanism of conventional type. It will be understood however that the invention can be otherwise embodied and that the drawing is not to be construed as defining or limiting the scope of the invention, the claims appended to this specification being relied upon for that purpose.

In the drawing:

Figure 1 is a vertical sectional view taken upon the central plane of the transmission mechanism.

Fig. 2 is an end elevation of the constant mesh gears.

Fig. 3 is an end elevation of the intermediate speed gears.

In the above mentioned drawing, I have shown but one modification of the invention which is now deemed preferable but it is to be understood that changes and modifications may be made within the scope of the appended claims without departing from the spirit of the invention.

Briefly and in its broadest aspect, my invention comprises the following principal parts: a drive shaft, a driven shaft preferably in alignment therewith; an intermediate shaft parallel to the driving and driven shafts, a gear on the driving shaft in mesh constantly with a gear on the intermediate shaft, a second gear on the intermediate shaft adapted to be engaged or disengaged with a sliding gear on the driven shaft, a clutch moving with the gear on the driven shaft so that the driving and driven shafts may be connected directly together when the second pair of gears are disengaged.

For purposes presently to be more fully described, the two gears on the intermediate shaft are provided with an equal number of teeth, the teeth of the constantly driven pair of gears connecting the driving and the intermediate shafts having their teeth proportionately enlarged to accommodate their greater diameter.

Referring more in detail to the figures of the drawing, I provide a transmission casing 10 having a driving shaft 11 rotatably mounted in a bearing 12 at one end, this shaft being, as it is well known, directly connected with the main driving shaft of an engine or other driving means. On this driving shaft 11 and within the transmission casing 10 is a spur gear 13. Extending in a direction parallel to the driving shaft and suitably spaced therefrom is the intermediate or jack shaft 14 on which may be rotatably mounted the cluster member 15 carrying two or more gears. This intermediate shaft 14 near one end carries a gear 16 forming part of the cluster member 15 which is in mesh with the gear 13 on the driving shaft 11. This pair of gears comprising gears 13 and 16 is constantly in mesh as will be evident from an inspection of the drawing.

In alignment with the driving shaft 11 and suitably supported therefrom in any conventional or well known manner is the driven shaft 18. This is rotatable within a bearing 19 at the opposite end of the transmission casing 10. On this driven shaft 18 is a sliding member 20 having a gear 21 formed thereon and having also a number of internal teeth 22 which act as a clutch. Means, not shown, are provided for sliding this member 20 along the driven shaft 18 which, as shown, may be splined so that rotation of the member 20 with the gear 21 will cause rotation of the driven shaft 18. The gear 21 on this driven shaft is adapted when moved to one position to engage the second gear 23 on the intermediate shaft 14. In this position of the sliding gear 21, the driven shaft 18 will be rotated at a speed greatly reduced from that of the driving shaft 11. Further movement of the sliding gear 21 on the driven shaft 18 engages the clutch teeth 22 with the corresponding clutch teeth 24 preferably formed directly on the driving gear 13. These clutch teeth are adapted to be simultaneously engaged with disengagement of the gear 21 on the sliding member 20 with the second gear 23 on the intermediate shaft 14. With the sliding gear 21 in this position, the driven shaft 18 will rotate at exactly the same speed as the driving shaft. With the gears 21 and 23 in mesh the transmission is in second or an intermediate speed while with gears 21 and 23 out of mesh and with the members 22 and 24 of the clutch engaged, the transmission is in high speed.

In addition to gears 16 and 23 on the intermediate shaft, gears 25 and 26 may preferably be provided for a third speed and reverse respectively. As these gears are so seldom used, it is not desirable or necessary to change the transmission members to eliminate noises developed in these lower speeds.

It has heretofore been the practice in transmission mechanisms of this type to use gears of exactly the same circular pitch throughout so that the size of the gear teeth in each of the transmission elements is identical. In order however to accomplish a predetermined speed ratio, the two gears 16 and 23 on the intermediate shaft 14 have had a different number of teeth. The numbers of course are roughly proportional to their diameters. In the present invention, I provide the gears 16 and 23 on the intermediate shaft 14 with exactly an equal number of teeth and proportionately increase the size of the gear teeth of the constant mesh gears 13 and 16 in accordance with the increased diameter of the gear 16 on the intermediate shaft 14. By changing the diametral pitch of the constant mesh pair of gears 13 and 16 from about 7 to 5.66, I can use twenty-four teeth on the driven member 16 of the constant mesh pair which is the number of teeth preferably used on the second gear 23 on the intermediate shaft 14. By this substitution of gears, the ratio usually maintained between the two pairs of gears is preserved. In reducing the number of teeth of gear 16 from say 30 to 23, the number of teeth in the driving gear 13 is proportionately reduced.

It will be obvious therefore that with equal numbers of teeth on the two gears 16 and 23 on the intermediate shaft 14 which rotate together, equal numbers of teeth of these gears will engage teeth on their meshing gears in equal intervals of time. The sound vibrations set up by these contacts of gears of both pairs of gears therefore will be equal, whereas, in the previously known transmissions having different numbers of teeth on the gears of the intermediate shaft, unequal sound vibrations will be set up which give rise to the discordant noises which are to be eliminated. The principal source of discordant noises in the transmissions will therefore be eliminated with the result that the noise heard will be of uniform pitch. With the gears 21 and 23 out of mesh and with the clutch members 22 and 24 engaged, the gears 13 and 16 will rotate idly but at the same speed as when they drive the gears 21 and 23. The noise therefore of the constant mesh gears rotating idly will be the same as when they drive the intermediate pair.

What I claim is:

1. A change speed mechanism comprising in combination, two pairs of selectively operative intermeshing gears drivingly connecting aligned shafts, means to connect driving and driven shafts directly together or through one of said pairs, one of said gears in each pair having equal tooth numbers but being of different diameter so that equal numbers of teeth of each pair are intermeshed in equal units of time.

2. A change speed mechanism comprising in combination, a driving shaft, an intermediate shaft, a driven shaft, means to drive said driven shaft directly from the driving shaft or through the intermediate shaft, one gear of each pair having equal tooth numbers and rotating at equal speeds so that equal numbers of teeth of each pair are intermeshed in equal units of time, the gears having equal tooth numbers being of unequal diameter.

3. A change speed mechanism comprising in combination, a driving shaft, an intermediate shaft, a driven shaft, gears connecting the driving and intermediate shafts and the intermediate and driven shafts together, the two gears on the intermediate shaft being of different diameter but having the same number of teeth whereby the sound vibrations from both pairs of gears will be of the same pitch.

4. A change speed mechanism comprising in combination, a driving shaft, an intermediate shaft, a driven shaft, a gear on said driving shaft constantly in mesh with a gear on said intermediate shaft, and a second gear on said intermediate shaft in mesh with a sliding gear on said driven shaft, the two gears on the intermediate shaft having the same number of teeth whereby the sound vibrations from both pairs of gears will be of the same pitch.

5. A change speed mechanism comprising in combination, a driving shaft, an intermediate shaft, a driven shaft, and pairs of gears connecting the driving and intermediate shafts and the intermediate and driven shafts, respectively, together, the driven gear of the first pair and the driving gear of the second pair of gears being of different diameter but having the same number of teeth, whereby the sound vibrations from both pairs of gears will be of the same pitch.

6. A change speed mechanism comprising in combination, a driving shaft, an intermediate shaft, a driven shaft, a pair of gears constantly in mesh and connecting the driving and intermediate shafts, and an optionally usable pair of gears connecting the intermediate and driven shafts, the driven gear of the first pair and the driving gear of the optionally usable pair having the same number of teeth, whereby the sound vibrations from both pairs of gears will be of the same pitch.

In testimony whereof, I hereto affix my signature.

EARLE BUCKINGHAM.